United States Patent
Taketani et al.

(10) Patent No.: US 10,354,100 B2
(45) Date of Patent: Jul. 16, 2019

(54) CODE, INFORMATION PROCESSING METHOD, INFORMATION PROCESSING APPARATUS, STORAGE MEDIUM, INK, PIGMENT, AND STORAGE DEVICE

(71) Applicants: Godo Kaisha IP Bridge 1, Chiyoda-ku, Tokyo (JP); YAEGAKI Bio-Industry, Inc., Himeji-shi, Hyogo (JP)

(72) Inventors: Masatoshi Taketani, Chiyoda-ku (JP); Kenichi Hashizume, Chiyoda-ku (JP)

(73) Assignees: GODO KAISHA IP BRIDGE 1, Tokyo (JP); YAEGAKI BIO-INDUSTRY, INC., Hyogo (JP)

(*) Notice: Subject to any disclaimer, the term of this patent is extended or adjusted under 35 U.S.C. 154(b) by 0 days.

(21) Appl. No.: 15/755,634

(22) PCT Filed: Aug. 31, 2016

(86) PCT No.: PCT/JP2016/075404
§ 371 (c)(1),
(2) Date: Feb. 27, 2018

(87) PCT Pub. No.: WO2017/038848
PCT Pub. Date: Mar. 9, 2017

(65) Prior Publication Data
US 2018/0253571 A1   Sep. 6, 2018

(30) Foreign Application Priority Data

Sep. 1, 2015   (JP) .................................. 2015-171980

(51) Int. Cl.
G06K 21/06 (2006.01)
G06K 1/12 (2006.01)
(Continued)

(52) U.S. Cl.
CPC ............... *G06K 1/123* (2013.01); *G06K 7/14* (2013.01); *G06K 19/06* (2013.01); *G06K 19/0614* (2013.01); *G06K 19/06028* (2013.01)

(58) Field of Classification Search
CPC ........... G06K 7/12; G06K 2019/06225; G06K 19/06037
(Continued)

(56) References Cited

U.S. PATENT DOCUMENTS

| 2011/0110586 A1* | 5/2011 | Takura | G06K 19/06037 |
| | | | 382/166 |
| 2011/0186638 A1* | 8/2011 | Funamoto | G06K 7/12 |
| | | | 235/469 |

(Continued)

FOREIGN PATENT DOCUMENTS

| JP | 11-083834 | 3/1999 |
| JP | 2938338 | 6/1999 |

(Continued)

OTHER PUBLICATIONS

Japanese Office Action dated Jul. 11, 2017 issued in Japanese family member No. JP2017-251256.

(Continued)

*Primary Examiner* — Ahshik Kim
(74) *Attorney, Agent, or Firm* — Venable LLP

(57) ABSTRACT

A code includes a first part printed by using a first pigment, and a second part printed by using a second pigment which is easier to discolor than the first pigment, wherein the code is decodable by using information about discoloration of the second pigment.

13 Claims, 13 Drawing Sheets

(51) Int. Cl.
*G06K 7/14* (2006.01)
*G06K 19/06* (2006.01)

(58) Field of Classification Search
USPC .............................. 235/462.04, 494
See application file for complete search history.

(56) References Cited

U.S. PATENT DOCUMENTS

2014/0346231 A1* 11/2014 Al-Omari ............ G06K 7/1417
　　　　　　　　　　　　　　　　　　　　　　　235/462.04
2018/0052053 A1* 2/2018 Atkinson ................ G01J 3/524

FOREIGN PATENT DOCUMENTS

| JP | 11-248552 | 9/1999 |
| JP | 2000-131152 | 5/2000 |
| JP | 2001-194248 | 7/2001 |
| JP | 2001-281002 | 10/2001 |
| JP | 2002-129139 | 5/2002 |
| JP | 2002-131145 | 5/2002 |
| JP | 2003-203210 | 7/2003 |
| JP | 2012-068811 | 4/2012 |
| JP | 2015-064886 | 4/2015 |
| WO | 03/058285 | 7/2003 |

OTHER PUBLICATIONS

Japanese Office Action dated Jul. 11, 2017 issued in Japanese family member No. JP2017-521256.

* cited by examiner

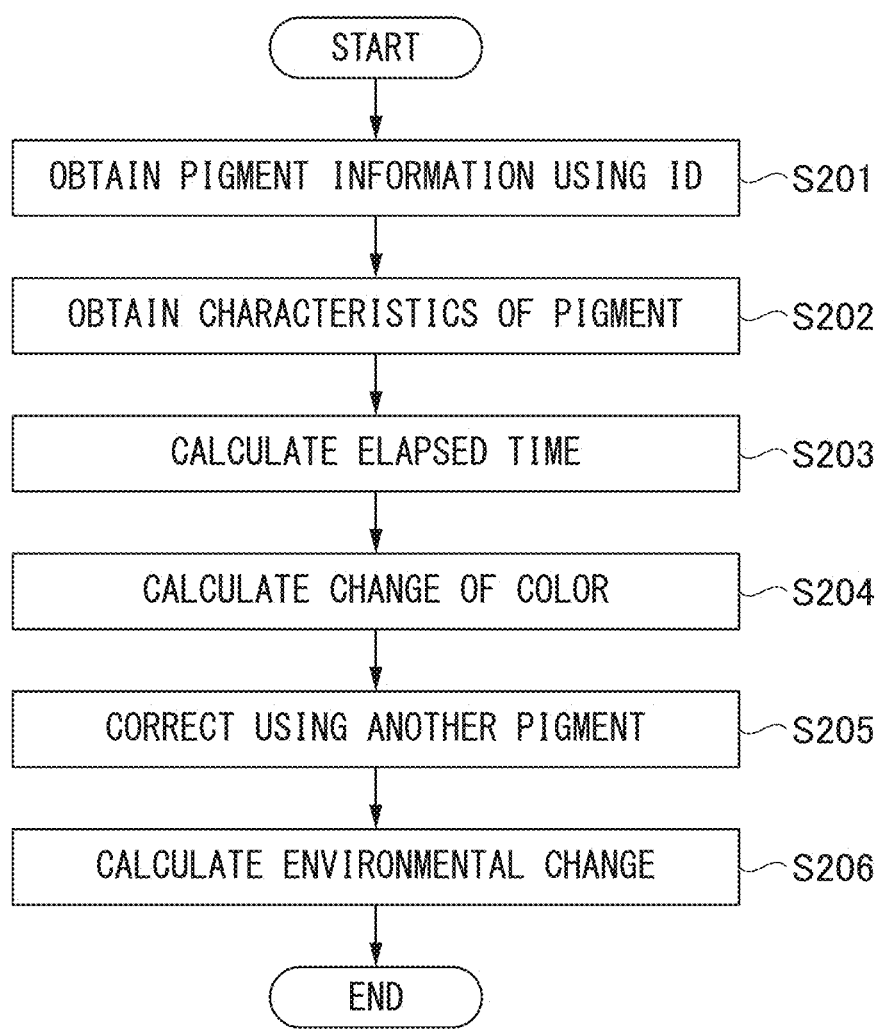

1 WEEK 40°C

Scan Date : 2015.7.13
Barcode Data : 1010011010
Density Data : 090,100,123,250,0....,120

2 WEEK 20°C

Scan Date :2015.7.20
Barcode Data : 1010011010
Density Data : 080,100,101,250,0....,120

4 WEEK 0°C

Scan Date : 2015.7.31
Barcode Data : 1010011010
Density Data : 100,100,102,250,0....,120

CODE, INFORMATION PROCESSING METHOD, INFORMATION PROCESSING APPARATUS, STORAGE MEDIUM, INK, PIGMENT, AND STORAGE DEVICE

TECHNICAL FIELD

The present invention relates to a code, an information processing method, an information processing apparatus, a storage medium, an ink, a pigment, and a storage device.

This application is a national stage of PCT application No. PCT/JP2016/075404 filed Aug. 31, 2016, which in turn claims priority of Japanese Patent Application No. 2015-171980 filed Sep. 1, 2015, the contents of which are incorporated herein by reference.

BACKGROUND ART

Barcodes are used for product management purposes. Since amount of information which can be held by a one-dimensional barcode is small, a two-dimensional barcode was invented.

For example, Patent Document 1 describes a two-dimensional barcode. When using a code holding information, the code may not be able to be read. Therefore, in the one-dimensional barcode, numbers which can be read by human eyes are written together at the bottom of the barcode. Further, error correction technology is used to the two-dimensional barcode to cope with lack of information held by the code.

CITATION LIST

Patent Literature

[Patent Literature 1]
Japanese Patent No. 2938338

SUMMARY OF INVENTION

Technical Problem

In order to suppress the lack of information held by the code, the code has been printed using an ink having high light resistance and high water resistance. As a result of development of ink material in recent years, the situation that information held by the code cannot be read due to scrape of printing or the like is unlikely to occur.

Obviously, the code is less likely to be printed using the ink whose state is easy to change under the influence of the environment as compared with the high-performance ink developed in recent years. However, the inventor of the present application has invented a code that provides new value by using the ink whose state changes under the influence of the environment

Solution to Problem

A code of the present invention includes a first part printed by using a first pigment, and a second part printed by using a second pigment which is easier to discolor than the first pigment, wherein the code is decodable by using information about discoloration of the second pigment.

Advantageous Effects of Invention

A new value for evaluating the influence of the environment can be provided.

BRIEF DESCRIPTION OF DRAWINGS

FIG. 5 is a flowchart showing data processing executed by a server.

DESCRIPTION OF EMBODIMENTS

First Embodiment

Hereinafter, a code, an information processing apparatus which reads and processes the code, and so on, are described with reference to drawings.

Figure 1:
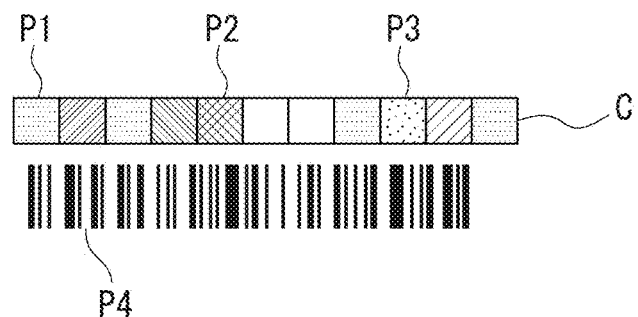
FIG. 1 is a drawing for explaining a code according to the present embodiment.

FIG. 1 is an example of a code for obtaining an environmental change. The code C shown in FIG. 1 has a part which holds an ID (identification information) formed with an ink containing pigment having high environmental resistance. In the present embodiment, this part is formed using BCI-350 XL having high light resistance manufactured by Canon Inc.

Further, the code C is formed using an ink (pigment P1) which is relatively weak against environmental changes or the like. For example, the code C is formed using a beet red manufactured by YAEGAKI Bio-industry, Inc., which is rather unstable to heat and light.

Table 1 shows characteristics of the beet red manufactured by YAEGAKI Bio-industry, Inc., which is an example of the pigment P1. Specifically, Table 1 shows elapsed days, L, a, b, b/a, HUE, and ΔE for each of storage conditions (1) to (3). The characteristics of the beet red are obtained by the following procedures.

(a) Apply the beet red uniformly to a filter paper (type: No. 2) manufactured by Advantech Co., Ltd.
(b) Dry the filter paper applied with the beet red in a cool dark place.
(c) Place the dried filter paper in a sealed plastic bag, and store it.
(d) Measure brightness, chromaticity, and so on of the beet red.

TABLE 1

| CONDITION | ELAPSED DAYS | L | a | b | b/a | HUE | ΔE |
|---|---|---|---|---|---|---|---|
| (1) | PRIMARY | 33.06 | 30.60 | 0.92 | 0.03 | 7.9RP | |
| ROOM | 3 DAYS AFTER | 32.40 | 30.73 | 1.16 | 0.04 | 8.2RP | 0.71 |
| TEMPERATURE | 5 DAYS AFTER | 32.72 | 30.67 | 1.02 | 0.03 | 8.0RP | 0.36 |
| (2) 50° C. | PRIMARY | 33.06 | 30.60 | 0.92 | 0.03 | 7.9RP | |
| | 3 DAYS AFTER | 34.75 | 28.98 | 2.11 | 0.07 | 8.6RP | 2.59 |
| | 5 DAYS AFTER | 34.85 | 29.12 | 2.12 | 0.07 | 8.6RP | 2.61 |
| (3) | PRIMARY | 33.06 | 30.60 | 0.92 | 0.03 | 7.9RP | |
| IRRADIATION | 3 DAYS AFTER | 34.19 | 29.33 | 1.82 | 0.06 | 8.4RP | 2.15 |
| | 5 DAYS AFTER | 33.56 | 29.88 | 2.84 | 0.10 | 9.2RP | 2.11 |

The storage condition (1) represents storage at room temperature, the storage condition (2) represents storage at 50° C., and the storage condition (3) represents refrigerator storage (fluorescent irradiation 9500 [Lux]). The elapsed days represent a number of days elapsed since the storage of the code C started. "L" represents a lightness L in the Lab color space. "a" and "b" respectively indicate chromaticities a and b in the Lab color space. "HUE" represents hue. "ΔE" represents a color difference of the code C compared to a color difference of the code C at the start of the storage.

As shown in Table 1, it is understood that the color difference ΔE of the beet red of the storage condition (2) is larger than that of the storage condition (1). Therefore, the color difference ΔE of the beet red increases as the temperature increases. Also, it is understood that the color difference ΔE of the storage condition (3) is larger than that of the storage condition (1). In other words, it is understood that the color difference ΔE of the beet red increases as the illuminance of the irradiated light increases.

In this way, the code C includes a first part which is relatively stable to environmental change and a second part which is relatively unstable to environmental change. The pigments (P3, P4) contained in the ink used to form the first part are called as a first pigment. On the other hand, the pigments (P1, P2) contained in the ink used to form the second part are called to as a second pigment.

In the present embodiment, it will be described by focusing on temperature as the environmental change. However, the code may be formed by focusing on environmental factors other than temperature, such as scratch resistance, light resistance, ozone resistance, or the like. It is assumed that one type of ink (pigment) greatly discolors due to two or more factors such as light and ozone. In this case, a pigment which has little influence on light and a pigment which greatly discolors by ozone are combined in order to distinguish whether the cause of greatly discoloring is influence of light or influence of ozone.

As described above, regardless of ambient temperature of the label on which the code C is printed, it is possible to maintain constant hue and density of the first part for a long time. On the other hand, a degree of discoloration (color fading, color degradation) of the second part depends on temperature environment. Here, even if the change in density is small and the degree of discoloration is difficult to be discriminated with human eyes, the difference can be detected by using a camera or a scanner. As shown in FIG. 1, as to temperature, it can be considered that a speed of discoloration (color fading) varies depending on a temperature range.

In the present embodiment, a pigment whose fading speed under environment of 40° C. or more and less than 50° C. is twice as fast as a fading speed under environment of 20° C. or more and less than 30° C. is used as the pigment P1. A pigment whose fading speed under environment of 40° C. or more and less than 50° C. is substantially the same as a fading speed under environment of 20° C. or more and less than 30° C. is used as the pigment P2. Further, a pigment whose color is difficult to fade without depending on temperature environment is used as the pigments P3 and P4. There is a possibility that the hue may appear to change due to light irradiation when photographing with a scanner or a camera. In order to prevent such influence at the time of photographing, a pigment which is difficult to be influenced by ambient temperature may be supplementarily used.

Encode and decode of the barcode holding the ID are in conformity with standards (ISO15394 or the like). Encode and decode of environmental information (temperature history, scratch history, and so on) will be described later.

[Explanation of Hardware Configuration]

Figure 2:
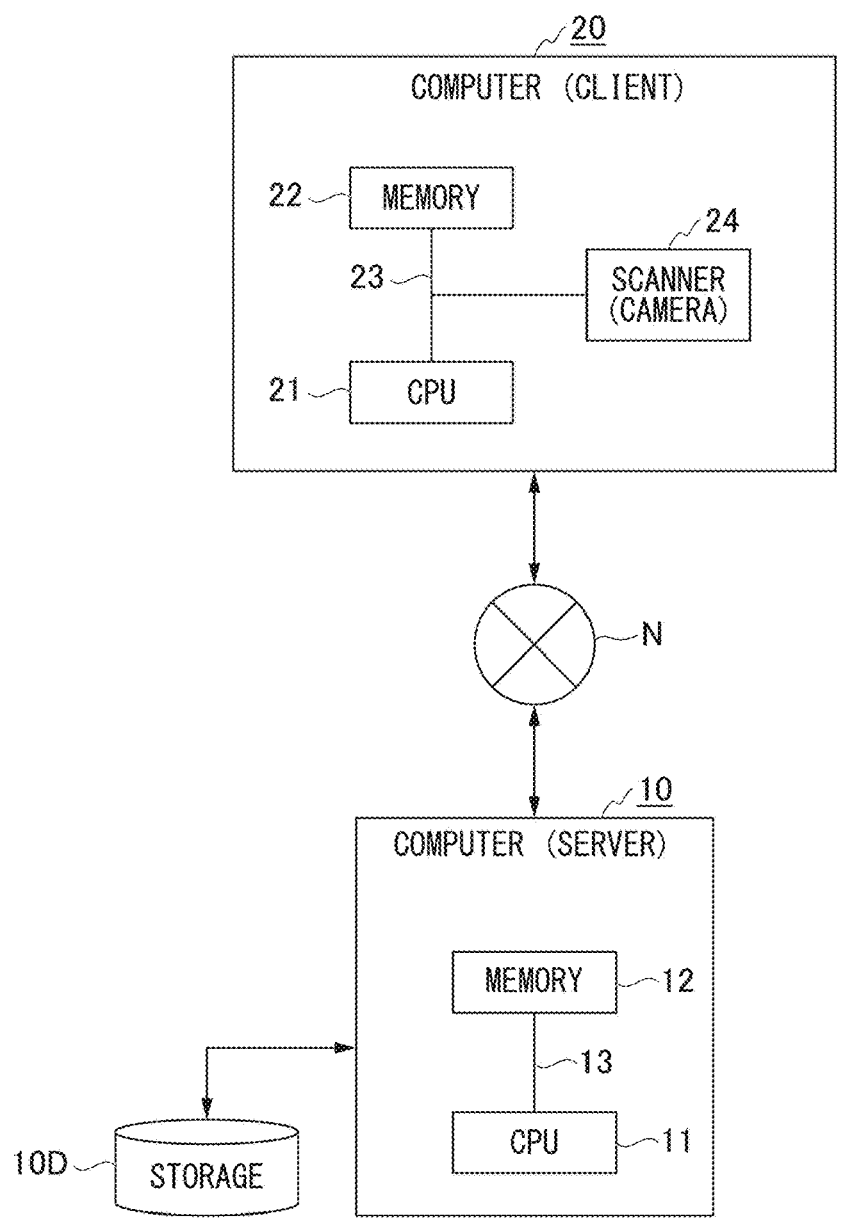
FIG. 2 is a drawing for explaining a hardware configuration and a network.

FIG. 2 is a diagram for explaining a hardware configuration and a network according to the present embodiment. A part of FIG. 2 is a block diagram for explaining an internal configuration of a computer constituting the network. As shown in FIG. 2, a computer as an information processing apparatus is connected to the network N. In the present embodiment, the computer 10 holds information on a pigment used for the code C and information on discoloration (color fading) characteristics of the registered pigment. Therefore, the computer 10 functions as a database server that holds information on pigments. Obviously, the information on the pigments registered in the computer 10 is registered through a user interface (hereinafter, referred to as UI) which is separately provided in a client. In response to a request from the client connected to the network N, the computer 10 which functions as a database server provides a Web page for registering the information on the pigments.

A portable information terminal 20 as a computer is connected to the computer 10 via the network N. Programs and the like which will be described later need not be executed only by the information processing apparatuses 10 and 20, but may be executed by other devices connected to the network N.

The computer 10 as an information processing apparatus stores the information on the pigments in the storage 10D as a storage device. Data structure stored in the storage 10D does not need to have a specific structure, and any format which can be processed by the information processing apparatus may be used. Further, the storage 10D may store information (electronic data), and may be a hard disk, an optical disk, a flash disk, or the like.

For convenience, a computer that requests information is called as a client, and a computer that transmits data in response to the request for information is called as a server. In the present embodiment, the computer 10 functions as a server, and the computer 20 functions as a client. Obviously, a part of the process may be shared by a plurality of computers. Therefore, a whole (system) of the computers may be regarded as the information processing apparatus. Even if elements that perform characteristic calculations are intentionally established abroad, if the region where the calculation result is referred to is domestic, it is assumed that the information processing has been executed domestically. These networks may be either the Internet or an intranet, and may be either wired or wireless.

An information processing unit (processor) that performs information processing is the CPU 11, and the memory 12 as a storage unit temporarily stores information processed by the CPU 11. Obviously, the memory 12 and the storage 10D function as a means for storing information, but alternatives may be used instead of the memory and the storage in accordance with changes in the architecture of the computer. The CPU 11 and the memory 12 are connected by the bus 13, and the CPU 11 accesses the information stored in the memory 12 via the bus in accordance with the program. Similarly, the computer 20 includes the memory 22 and the CPU 21, and these are connected by the bus 23.

In the present embodiment, the computer 20 includes the scanner (camera) 24 as a reading unit. Further, the computer 20 includes a wireless communication module (not shown) for connecting to the network N. For example, if the computer 20 includes an optical camera such as a smartphone, a wireless module for connecting to a public network, and so on, the computer 20 functions satisfactorily.

[Data on Pigments]

Figure 3A:
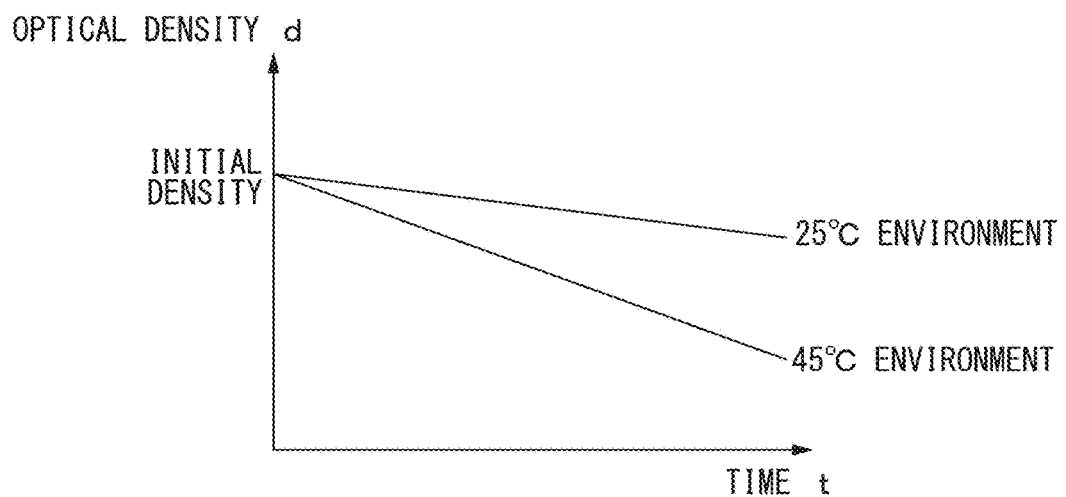
FIG. 3A is a graph showing characteristics of a pigment P1.
Figure 3B:
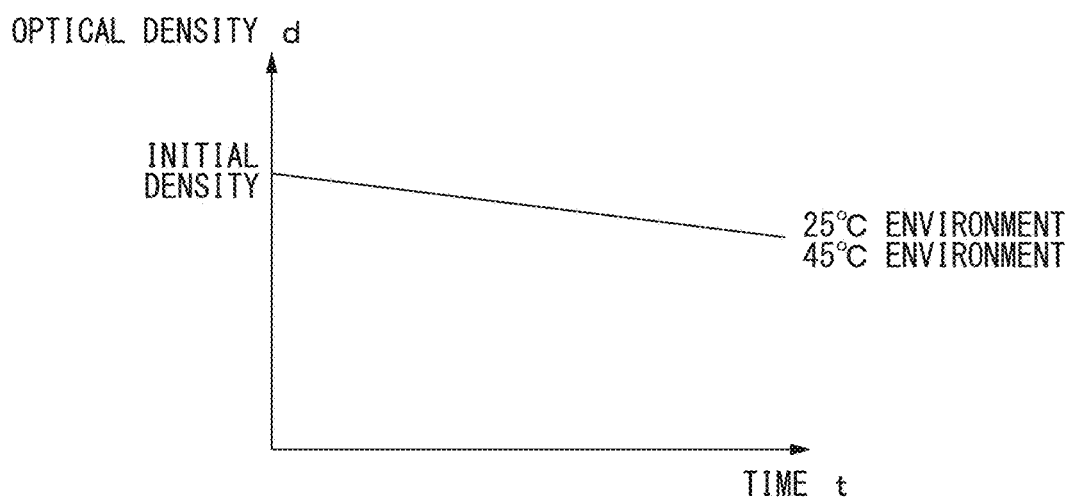
FIG. 3B is a graph showing characteristics of a pigment P2.

FIGS. 3A and 3B are graphs for explaining characteristics of the pigments used for printing the code C. FIG. 3A is a drawing for explaining a relationship between color fading and elapsed time for the pigment P1. Similarly, FIG. 3B is a drawing for explaining a relationship between color fading and elapsed time for the pigment P2. These pieces of information are stored in the storage 10D. In the present embodiment, in order to explain simply, these will be described using a model in which the optical density linearly decreases. Obviously, information on pigments is rarely determined by only one factor. Therefore, information on how the optical density and the hue change for a single pigment under a plurality of environmental conditions is stored in the storage 10D. Obviously, there are cases where the optical density decreases linearly with time, but there are cases where the optical density changes exponentially or the optical density rapidly decreases after a lapse of a predetermined time. In addition to the optical density, even hue, chroma, brightness, RGB value or the like may be used as information indicating characteristics of the pigment as long as they indicate a state of the pigment.

As shown in FIG. 3A, the decreasing rate of the optical density of the pigment P1 under the 45° C. environment is larger than the decreasing rate of the optical density of the pigment P1 under the 25° C. environment. On the other hand, as shown in FIG. 3B, the decreasing rate of the optical density of the pigment P2 under the 25° C. environment is approximately the same as the decreasing rate of the optical density of the pigment P2 under the 45° C. environment. In such a situation, the pigment P2 is more stable to the environment (temperature) than the pigment P1.

Here, since a correspondence relationship between a change amount of the optical density and an elapsed time depends on the pigment used in accordance with a required accuracy as a temperature logger, details will be described later.

As for environmental conditions, in a normal environment, it will be affected by multiple influences such as light and temperature. Therefore, it is possible to partially correct the influences of the external environment by considering a plurality of tables. For example, if the influences of temperature and light are handled using two variables, it can be corrected by using a pigment having low sensitivity to temperature. Therefore, if an accuracy of temperature history is important, it is possible to improve the accuracy by calculating using a plurality of pigments having sensitivity to temperature. Besides, in a case of holding characteristics of the pigment as other variable functions, characteristics for a specific environmental element may be extracted using a partial differential method or the like.

The graph shown in FIG. 3 may be a formula of a polynomial approximation. The characteristics of such pigments are created using test results in different environments. For inks using organic pigments, differences of characteristics for each lot may be taken into consideration.

[Detailed Description on Data Processing]

Next, a processing method of information on the environmental history held by the code C will be described using a flowchart. FIG. 4, FIG. 5, FIG. 6A, and FIG. 6B are flowcharts for explaining a data processing method according to the present embodiment. Specifically, FIG. 4, FIG. 5, FIG. 6A, and FIG. 6B are flowcharts for explaining an information processing method for calculating environment information based on information on color fading (discoloration) of the pigment of the code C.

Figure 4:
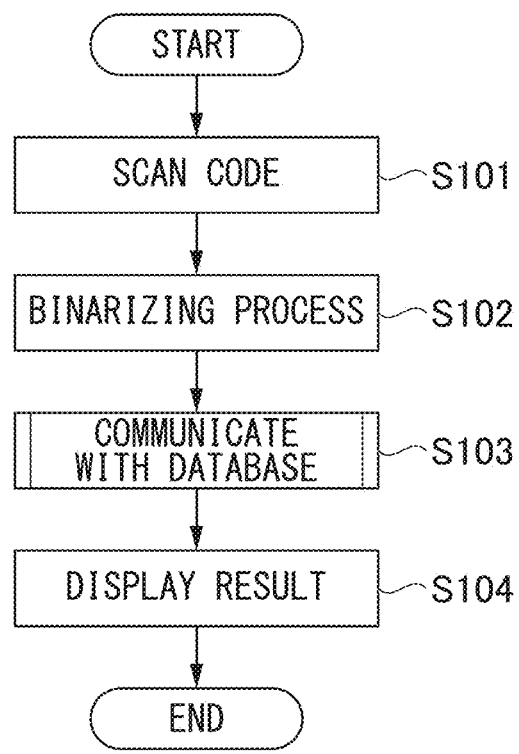
FIG. 4 is a flowchart showing data processing executed by a client.

In the present embodiment, the flowchart shown in FIG. 4 is executed by the client (computer 20), and the flowchart shown in FIG. 5 is executed by the server (computer 10). Also, it is not necessary to execute all the characteristic calculations by the computer 20, and a part or all of the calculations may be executed by another computer. In this case, the client only needs to have functions of reading the code, requesting processing to the server, and displaying the result from the server. Obviously, the client may link a plurality of single function devices. To the contrary, if the client can hold all the databases related to the pigments, it may be processed in stand-alone. As to the information on the pigments stored in the storage 10D, a format suitable for processing such as Extensible Markup Language (XML) may be used.

The client (computer 20) scans the code C using the scanner 24 (S101). As a result, the computer 20 obtains ID data from the barcode. Similarly, the computer 20 obtains the optical density for each pigment for a part where each pigment is formed. Specifically, the computer 20 obtains the optical density with 256 tones (00 to FF in hexadecimal number). Obviously, the computer 20 may obtain the optical density with other methods such as RGB values.

Next, the CPU 21 binarizes the obtained code C (S102). If it is decoded using color data when obtaining ID data, there is a possibility that it is affected by color change. For this reason, for example, black and white binarization is executed to reduce the influence.

Next, the CPU 21 inquires the server (computer 10) by using the decoded ID data (S103). Specifically, the CPU 21 transmits the ID data to the computer 10, and receives information on the pigment used in the code C from the computer 10. Further, the CPU 21 transmits, to the computer 10, information on date and time when the code C was scanned by the scanner 24. Although the computer 20 may execute a calculation relating to the temperature history, the server (the computer 10) calculates the temperature history in the present embodiment.

On the basis of the data transmitted from the computer 20, the computer 10 executed a calculation which will be described later. The computer 10 transmits the calculation result to the computer 20. The computer 20 which has received the calculation result displays the result on a display (not shown) of the computer 20 in order to inform a user of the result (S104).

Next, a process performed by the computer 10 will be described with reference to the flowchart shown in FIG. 5. The computer 10 receives the ID information and the information on the optical density of the pigment which has been transmitted from the computer 20 (S201).

The computer 10 holds information on the pigments used for the code C as a database. Therefore, the computer 10 obtains the information on the pigments used for the code C and its characteristics based on the ID information transmitted from the computer 20 (S202). For example, it can be understood that the first pigment from the left above the barcode which holds the ID information of the code C is the pigment (P1) whose color fading (discoloration) is fast in a high-temperature environment, the fifth pigment from the left is a pigment which is stable regardless of the ambient temperature. As a result, based on information on an original optical density of the pigment and the elapsed time, it is possible to calculate to specify what kind of environment the code C was placed in.

The computer 20 specifies the characteristics of the pigments used for the code C by using the ID information. Further, the computer 10 can obtain the optical density at the time of printing the pigment corresponding to the ID specified by the computer 20 (or at the time of previous inquiry). Therefore, the computer 10 calculates the elapsed time based on current obtained date and time of the code C and past obtained date and time (scanning date and time) of the code C (S203).

Further, the computer 10 calculates a difference (color change) of the optical density based on a current optical density of the code C and a past optical density of the code C (S204).

In addition, the computer 10 uses the characteristics of a plurality of the pigments to improve the accuracy of specifying the condition to be determined (S205). For example, it is considered that the accuracy of specifying a temperature environment is improved using a pigment sensitive to temperature. Obviously, it is best that the pigment sensitive to temperature has sensitivity only to temperature, but it may also be affected by other environmental conditions such as light. In such a case, the computer 10 uses a change of the optical density of the pigment having low sensitivity to the temperature placed in the code C to extract an influence of the light and correct the difference of the optical density (color change).

The computer 10 uses the characteristics of the plurality of the pigments to calculate what kind of environment the code C was placed in by mainly using a difference of the optical density due to the influence of temperature and the elapsed time (S206). Specifically, the computer 10 uses an environment correspondence table (for example, a look up table (LUT) illustrated in FIG. 3A and FIG. 3B) held for each pigment to calculate the environmental change by using the difference of the optical density and the elapsed time. The computer 10 transmits the calculation result of the calculated environmental change to the computer 20.

Figure 6A:
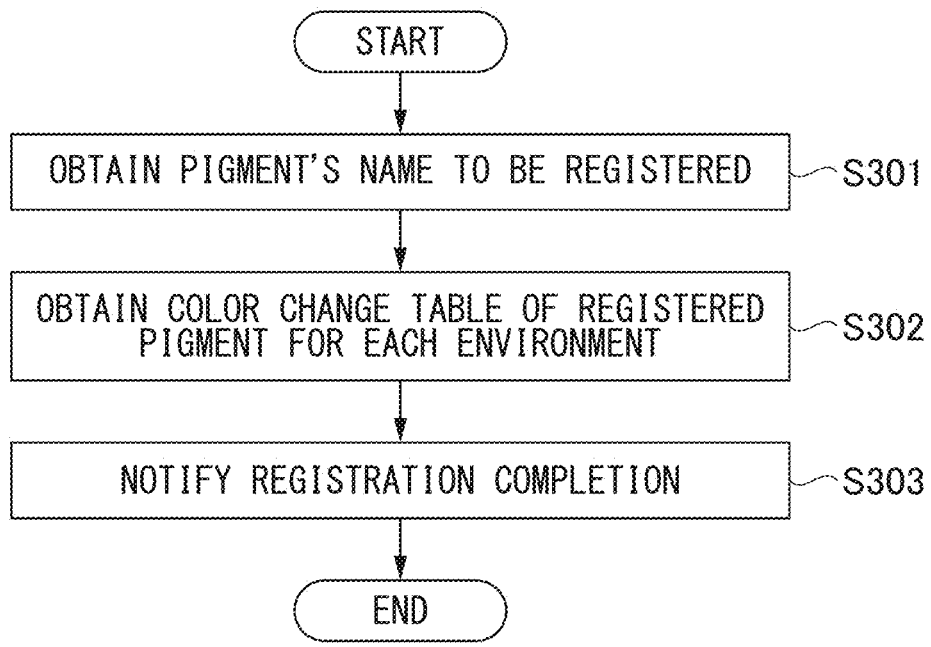
FIG. 6A is a flowchart showing processing for storing characteristics of pigments in a database.
Figure 6B:
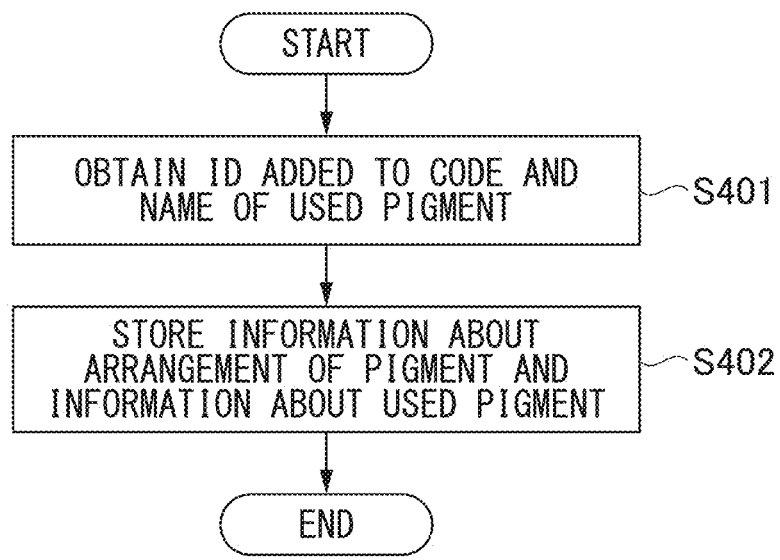
FIG. 6B is a flowchart showing processing for setting an encoding condition of the code C.

Furthermore, a flow of registering the characteristics of the pigments in the computer 10 functioning as a server will be described with reference to the flowcharts shown in FIG. 6A and FIG. 6B.

The database (storage 10D) of the computer 10 stores information on the characteristics of the pigments, and the computer 10 executes the calculation using the characteristics of many pigments. At this time, a user interface for registering data on the characteristics of the pigments is required.

In the present embodiment, the computer 10 has a function of a Web server, and provides an interface for registering the characteristics of the pigments. Hereinafter, operation of the computer 10 when storing the characteristics of the pigments in the database will be described with reference to FIG. 6A.

The computer 10 obtains a pigment name possessed by a pigment vendor (S301). Obviously, if the pigment name has already been registered, the computer 10 notifies the client (the computer 20) of that. Further, if the characteristics are different for each lot, the computer 10 adds a difference of the characteristics for each manufacturing lot number according to the pigment name.

As to the characteristics of the pigment to be registered, the computer 10 can receive them in a form of, for example, a graph as shown in FIG. 3, an approximate function, a table, or the like. Obviously, the computer 10 has to receive them so that the environment change can be specified by specifying a variable as described above. For example, if it is a characteristic relating to scratch resistance of the pigment, the computer 10 receives, as a table, a density reduction amount when scratching ten times with a nail, a density reduction amount when scratching twenty times, and so on. Obviously, the computer 10 may store not only the density reduction in a case of scratching with one object (nail) but also a relationship in a case of scratching with a plurality of objects (cloth, cardboard, or the like) as a table. Further, the computer 10 may store only a correction coefficient in the database for each object.

When receiving the information on the optical density and the hue change of the pigment from the client as described above, the computer 10 stores the received information in the database (S302). After a completion of storing the received information in the database, the computer 10 notifies the client that various information of the pigment has been stored in the database (S303).

Here, the computer 10 also needs to hold correspondence relationships between the ID information assigned for each code and information on which pigment was used for creating the code. Obviously, the computer 10 may code these pieces of information, and may add them together with the code C. However, in the present embodiment, it is explained that the ID information of the code C and the pigment information corresponding thereto are stored in the database. Therefore, generating and updating a correspondence between the ID information and the pigment information will be briefly described.

Hereinafter, processing of holding ID information and placement of pigments in advance in the server and assigning an encoding condition of the code C to a code utilizing company will be described with reference to FIG. 6B. Obviously, a company using the code C may apply the ID to the server, may determine the placement of the pigments corresponding to the assigned ID, and may register them in the server.

First, an environmental condition to be specified is obtained by using the code C. For example, this condition is paying attention to "elapsed time in a dark place at 40° C." or the like. In order to satisfy the above condition, related pigments are extracted based on characteristics of pigments registered in the database. Encodings for them can be created by referring to the information of the database constituted by the processing described from S301 to S303.

Specifically, a pigment to be used for the code is specified in consideration of characteristics of each pigment. For example, there are cases where an optimum pigment is different between when printing by using an inkjet method as the printing method and when printing by using an offset method. Further, a temperature band in which it is easy to discolor differs for each pigment. Therefore, the code is created in accordance with characteristics of pigments, such as a pigment sensitive to temperature, a pigment sensitive to light, a pigment sensitive to specific gas, or the like. The structure of the created code is registered in the database.

The computer 10 obtains these pieces of information in order to store the ID assigned to the code and a name of the pigment to be used in association with each other (S401). Then, the ID information and arrangement information representing an arrangement order of the pigments are associated with each other and stored in the database (S402). For example, information representing that the code of ID "100" has an optical density "A, B, C, D" in an order of "pigment A, pigment B, pigment C, pigment D" at "date and time A" is stored in the database. Further, the code of ID "101" has an optical density "A, B, C, D" in an order of "pigment A, pigment A, pigment D, pigment D" at "date and time B" is stored in the database. A specific example will be described assuming that the computer 10 holds the above-described information.

In the present embodiment, what kind of information processing is performed to the information obtained by the computer (information processing apparatus) has been described. Obviously, the above-described information processing method may be implemented by providing a program for causing a computer to execute the above-described information processing method and a storage medium storing the program.

[Description of Example of Temperature History]

A flow from when reading the code C to when calculating an environmental situation in the present embodiment will be described with reference to FIG. 7 to FIG. 10.

In many prior arts, when creating the code C, the code C was printed using a pigment which does not fade and discolor as much as possible. This is for avoiding an occurrence of a reading error in which, for example, if originally held data is "0001001", the code is read as "0000000" caused by lack of codes due to discoloration or the like. For this reason, it has been common to use pigments having high environmental resistance when printing the code C. On the other hand, in the present embodiment, a pigment having low environmental resistance and a pigment having high environmental resistance are used for the code C.

Specifically, a part representing the ID information is printed with a pigment having high environmental resistance in order to suppress the lack of information. Furthermore, a part other than the part holding the ID information is printed with a pigment having low environmental resistance. Obviously, a part of the code, which holds the ID information, may be formed using a pigment having low environmental resistance, but it is desirable that a decoding method for reducing fluctuation in optical density of the pigment having low environmental resistance is used.

Density (color tone) changes with a lapse of time because color materials having high color-fading characteristics are used. Therefore, it is desirable to record the optical density and the hue in association with date and time. When accessing the server, it is possible to update and refer to ID information, date and time, and state of the code.

Figure 7:
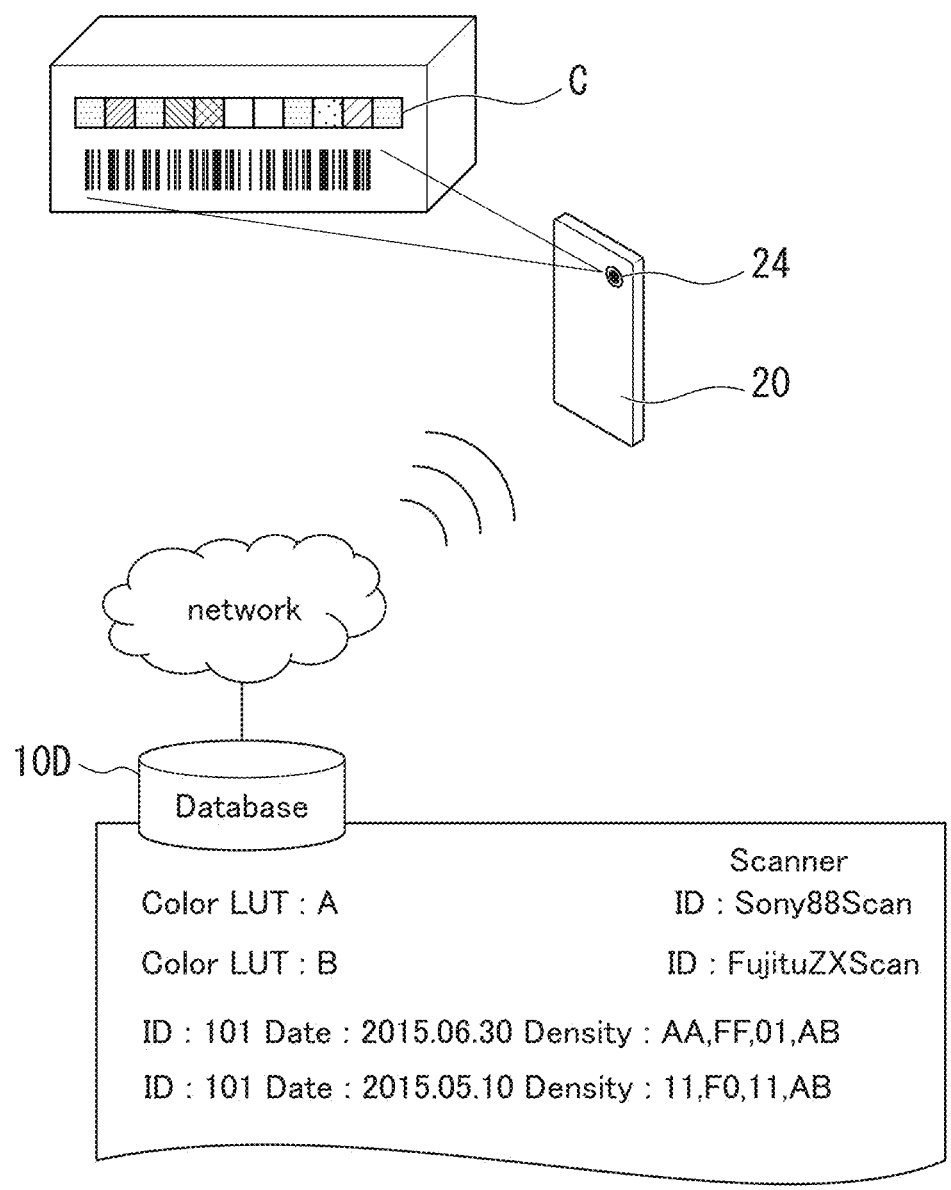
FIG. 7 is a drawing showing a reading operation of the code C.

The outline will be explained with reference to FIG. 7. The computer 20 (portable information terminal) reads the code C printed on a box with a camera 24 (scanner). After reading it, the computer 20 accesses the predetermined server via the network. The server has a storage 10D, and a database which holds information of pigments is built in the storage 10D. For example, it holds a LUT for each pigment, an ID of the scanner (or portable information terminal) that reads the code C in a previous time, date and time when the code C was actually read, an optical density at the date and time, and so on.

Figure 8:
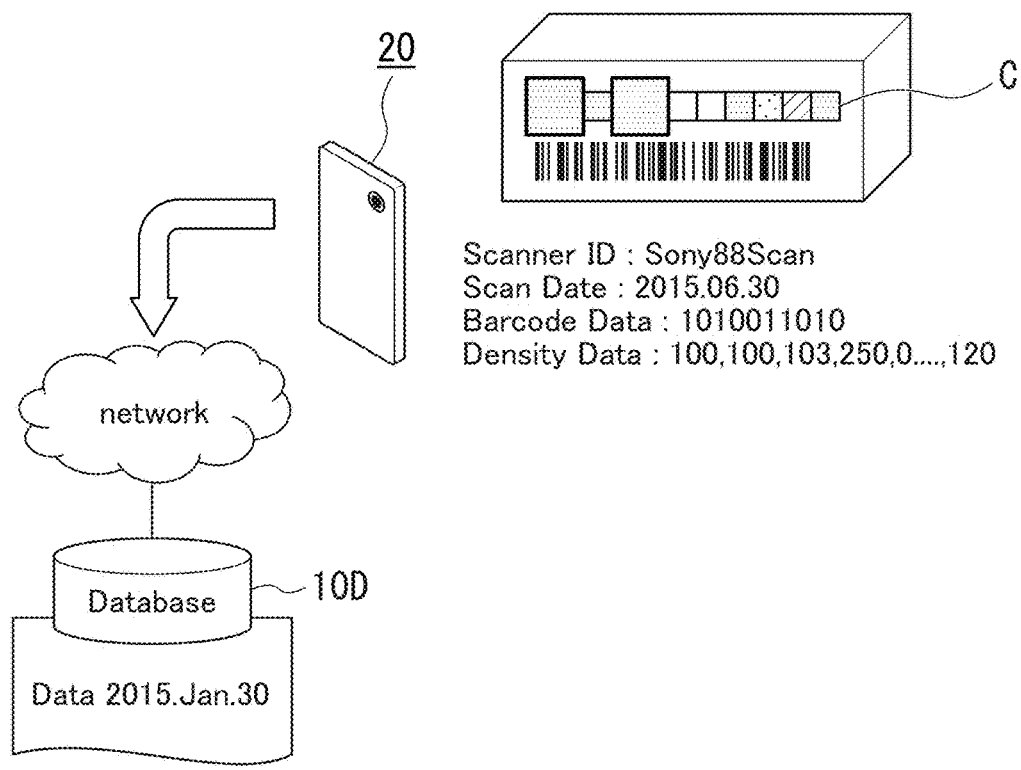
FIG. 8 is a drawing showing an example of data read by the computer 20 on Jun. 30, 2015.

As shown in FIG. 8, as an example of data read by the computer 20 on Jun. 30, 2015, the scan date, the barcode data representing the data of the barcode, the density data representing placement of the optical densities of the pigments placed in the upper part. The computer 20 inquires the database using the barcode data. At this time, the date and time of the inquiry and the scan date and time are stored as history in the database.

Figure 9A:
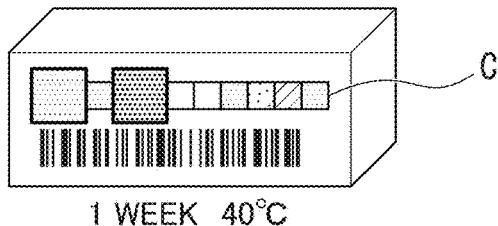
FIG. 9A is a drawing showing an example of data read by the computer 20 on Jul. 13, 2015.
Figure 9B:
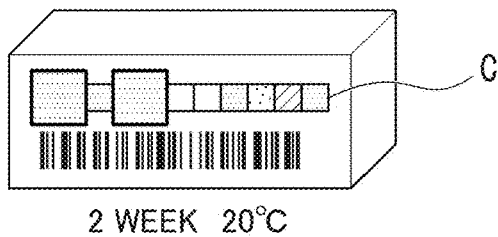
FIG. 9B is a drawing showing an example of data read by the computer 20 on Jul. 20, 2015.
Figure 9C:
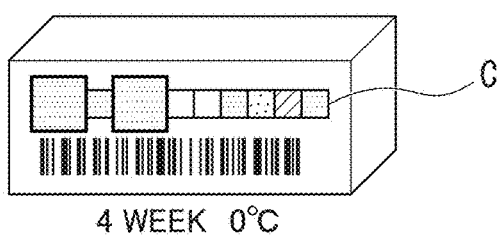
FIG. 9C is a drawing showing an example of data read by the computer 20 on Jul. 31, 2015.

As shown in FIG. 9A to FIG. 9C, a state of the code C, such as hue of the pigment having relatively low environmental resistance, changes depends on a condition of the box (product) to which the code C is attached. An optical density of some pigments may become high in a special environment. This is because of the characteristics of the pigment, and the density does not always uniquely decrease as time elapses. In the example of the code C, the optical density of the first pigment from the left tends to decrease. To the contrary, the third pigment is formed with a pigment whose optical density increases in a high temperature environment.

For example, it is assumed that the placement of the optical density is "100, 100, 103, 250, 0, . . . , 120" on Jun. 30, 2015.

Here, in a case that the box have been left in an environment of 40° C. for one week, the density data becomes "090, 100, 123, 250, 0, . . . , 120" (refer to FIG. 9A). If the box have been left in an environment of 20° C. for two weeks, the density data becomes "080, 100, 101, 250, 0, . . . , 120" (refer to FIG. 9B). If the box have been left in an environment of 0° C. for four weeks, the density data becomes "100, 100, 102, 250, 0, . . . , 120" (refer to FIG. 9C).

If a database storing test results shown in FIG. 9 is used, it is possible to presume what kind of situation the box on which the code is printed was actually in.

Figure 10:
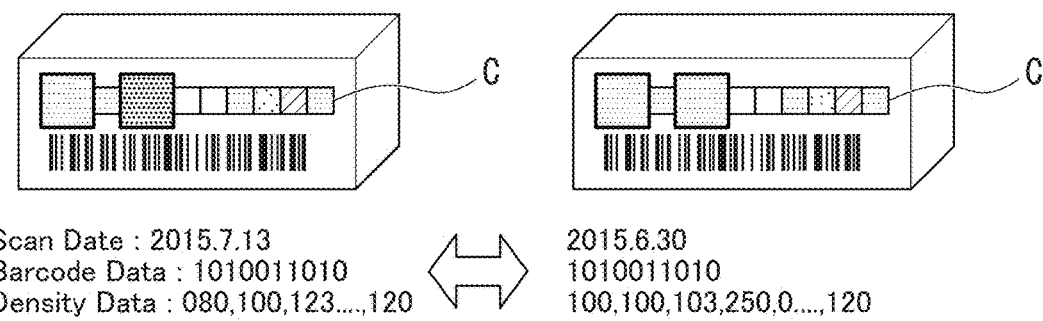
FIG. 10 is a drawing showing an example of data obtained by scanning in the past and data obtained by scanning at this time.

As a case that is understandable easily, the situation shown in FIG. 10 will be described. It is assumed that the code C is read again after a predetermined time has lapsed from the previous scan. At this time, it is assumed that the scan date is Jul. 13, 2015, the ID information of the barcode does not change and is the same as "1010011010", and the density placement is "080, 100, 123, . . . , 120". Since past density data and past scan date of the same ID are stored in the database, the data obtained by the past scan and the data obtained by the current scan are compared with each other to obtain a difference between them so that lapse of time and change of color can be understood.

At the current time, two weeks has lapsed after the previous scan, the density of the first pigment from the left has decreased from 100 to 80, and the density of the third pigment from the left has increased from 103 to 123.

In this way, the computer 10 obtains data representing a tendency of color fading in accordance with temperature, past scan date and past color data, and current scan date and current color data. The computer 10 calculates a lapse of time based on a difference between the current scan date and the past scan date. Further, the computer 10 calculates a change of color based on a difference between the current color data and the past color data. The computer 10 can determine under what kind of environmental conditions the pigment has faded based on the calculated lapse of time and the calculated change of color with reference to the lookup table.

As shown in FIG. 9A to FIG. 9C, comparing the environmental condition and the change of data, the density of the third pigment from the left tends to increase at high temperature (about 40° C.) even in a short period of time. On the other hand, the density of the first pigment from the left does not almost decrease at low temperature (about 0° C.), but the density decreases in proportion to time when it is higher than room temperature (about 20° C.).

Therefore, when considering the density placement and the information on the characteristics of the pigments stored in the database, which have been obtained on Jul. 13, 2015, it is possible to predict the environment in which the box on which the code is printed was left. Specifically, it can be presumed that it was left in an environment which is the same level as an environment in which it has been left for one week at a temperature of about 40° C. Obviously, the more an amount of accumulated information on discoloration of pigments increases, the more an accuracy of the presumption can be improved. Therefore, it is desirable to perform many environmental duration tests for each pigment and to store a lot of information in the database. Obviously, the data obtain by the environmental tests may be accumulated, and characteristics of pigments calculated based on the accumulated data may be expressed by using a high-degree polynomial representing a variation of the density, which has been approximated by many variables.

[Other Code Forms]

Figure 11A:
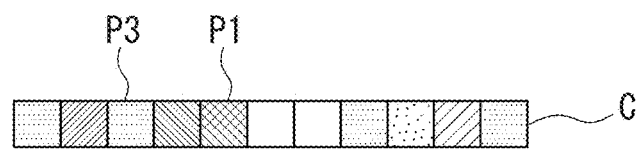
FIG. 11A is a drawing showing another form of the code C in the first embodiment.

In the above-described embodiment, the code C is held in a barcode format so that the ID information can be easily read, and a pigment which easily discolors due to an environment is placed above the barcode so that it can be easily read. However, the form of the code is not limited to the form illustrated in FIG. 1. For example, as shown in FIG. 11A, only color codes may be placed. In this case, the pigment P1 whose fading speed under environment of 40° C. or more and less than 50° C. is twice as fast as a fading speed under environment of 20° C. or more and less than 30° C. is placed, and the pigment P3 which is capable of maintaining a stable hue and a stable density regardless of environmental situations is placed as several pigments from the left. For example, if the optical density is very stable, the three pigments from the left are determined with 256 gradations so that 256×3 kinds of ID information can be held theoretically. Although it is possible to hold more information by further considering the color tone, it is desirable to add an error correction function appropriately in consideration of changes of the pigments and a stability of the scanner.

Figure 11B:
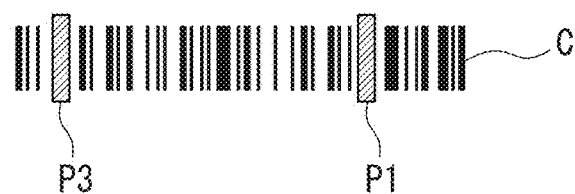
FIG. 11B is a drawing showing another form of the code C in the first embodiment.

Similarly, as shown in FIG. 11B, the pigment P1 that discolors in accordance with environmental conditions may be embedded in a part of the barcode, and the pigment P3 which is capable of maintaining a stable hue and a stable density regardless of environmental situations may be embedded in a part of the barcode. In this case, the data is binarized to black and white with the color information of the pigment ignored, and the ID information is decoded by a decoding method of barcode.

Although the code C shown in FIG. 11B can hold high density data, it is difficult to read the code because of discoloration of the pigment. Therefore, a time-dependent change may be predicted by using the pigment P1 which discolors in accordance with the environment, and the data may be corrected based on the predicted time-dependent change. As a result, it is possible to perform an error correction for correcting high density data.

Figure 12A:
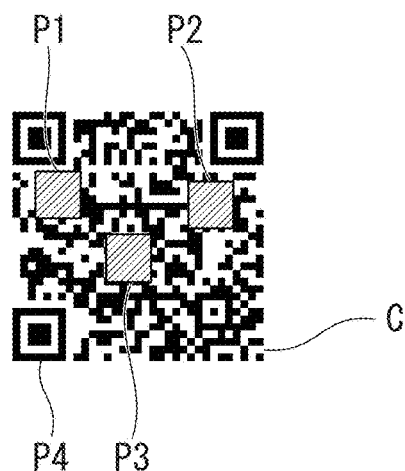
FIG. 12A is a drawing showing another form of the code C in the first embodiment.
Figure 12B:
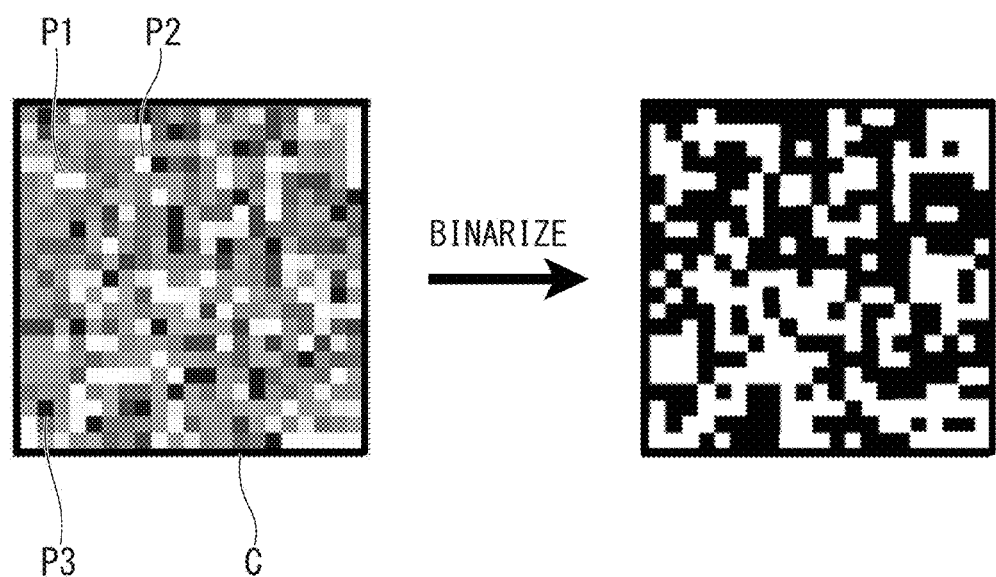
FIG. 12B is a drawing showing another form of the code C in the first embodiment.

Further, as shown in FIG. 12A, discoloring dots may be embedded in a part of a QR code (registered trademark). Specifically, the pigment P1 whose fading speed under environment of 40° C. or more and less than 50° C. is twice as fast as a fading speed under environment of 20° C. or more and less than 30° C., the pigment P2 whose fading speed under environment of 40° C. or more and less than 50° C. is substantially the same as a fading speed under environment of 20° C. or more and less than 30° C., and the pigments P3 and P4 which are capable of maintaining a stable hue and a stable density regardless of environmental situations may be placed in the code C. The pigment P4 is used in a part for holding the ID information. Also in this case, the black-white binarization may be performed, and regions may be divided to perform the processing. Further, as shown in FIG. 12B, information amount per unit area may be increased more than the QR code (registered trademark) by further using color data. In this case, the ID information may be extracted with the color information ignored, and the code C may be divided into regions for each function to be coded and decoded.

[Applicable Pigment]

As results of research and development on pigment and ink in recent years, pigments having high environmental resistance have been developed. To the contrary, a pigment having low environmental resistance is used unless the environmental resistance is not improved.

TABLE 2

| | OIL-BASED INK | WATER-BASED INK | GEL INK |
|---|---|---|---|
| POLAR CHARACTER | LIPOPHILIC PROPERTY | HYDROPHILIC PROPERTY | HYDROPHILIC PROPERTY |
| INK MATERIAL | DYE (OR PIGMENT), ALCOHOLIC SOLVENT, RESIN, ADDITIVE | PIGMENT (OR DYE), WATER, ADDITIVE | PIGMENT, WATER, ADDITIVE |
| VISCOSITY | HIGH | LOW | LOW-MIDDLE |
| BASE IN ACCUMULATION OF INK | EASY TO ACCUMULATE | DIFFICULT TO ACCUMULATE | DIFFICULT TO ACCUMULATE |
| BLEEDING | NOT EXIST | EXIST | NOT EXIST |
| WATER RESISTANCE | GOOD | DYE/BAD, PIGMENT/GOOD | GOOD |

As shown in Table 2, the oil-based ink, the water-based ink, and the gel ink have different characteristics. Similarly, there are characteristics for each pigment. An ink may be selected in consideration of these characteristics, and a pigment suitable for the ink may be selected. For example, an appropriate ink is selected in accordance with a sharpness or the like required for a code format such as a barcode (GS1 DataBar), a QR code (black and white inversion), composite (CC-A), DataMatrix, or the like.

Pigments derived from organic substances will be described in detail below.

As an example, a monascus pigment will be described. The monascus pigment is a coloring agent whose base compound is a pigment extracted from fungus of monascus purpureus of Ascomycetes. The monascus pigment is relatively stable to heat, and relatively unstable to light. As other characteristics, the monascus pigment is soluble in water, and its density decreases due to water adhesion. In addition, its color changes under a specific pH environment.

The monascus pigment is used as an edible pigment, and it is safe to oral intake in comparison with other coloring matter of pigment. Specifically, examples of the monascus pigment include MR-RL101, MR-NL201, MR-YL201, MR-NP101, MR-NP201, MR-OS101, and so on.

In cases of these organic pigments, the hue tends to change in accordance with environmental conditions in comparison to inorganic pigments and synthetic pigments. As another example, a cochineal pigment is used as an edible pigment like a gardenia red pigment, but the cochineal pigment is very stable to light and heat in comparison to the gardenia pigment. On the other hand, color tone of the cochineal pigment changes easily depending on the pH range.

Such pigments having a difference in water solubility are embedded in a cord so that the code for obtaining data such as washing frequency, washing number of times, or the like can be created. By adding such a code, it is possible to obtain information on clothes which are often washed in a short period of time or the like (in other words, fondness).

These pieces of information may be fed back to a design maker of clothes in consideration of a purchase date, a use period, and a deterioration speed. In addition, by placing the code at a position for reading the code easily, information on clothes in a closet may be obtained and a virtual closet may be created. This virtual closet can actually propose a new coordination in consideration of the information on own clothes, its durability, and so on. Obviously, if the information on own clothes is positively provided to a real store, the provided information can be used for purchase of stock on the store side. For this reason, discounts may be offered in exchange for these pieces of information.

Other pigments include lac pigment, beet red, anthocyanin pigment, safflower red pigment, pepper pigment, hematococcus algae pigment, annatto pigment, palm oil carotene, marigold pigment, (β-carotene, safflower yellow pigment, turmeric pigment, gardenia yellow pigment, monascus yellow pigment, gardenia blue pigment, gardenia green pigment, caramel pigment, and so on. Characteristics thereof can be adjusted appropriately in accordance with a manufacturing lot and a manufacturing method.

Here, it is assumed that the code C is directly printed on a label, a box, a package, a wrap, or the like. Therefore, initial characteristics (density, hue) of the pigment are stored in the server. This is to identify a progress environment by comparing with the initial state.

On the other hand, a special film (for example, an oxygen-impermeable film) or the like may be placed on the printed cord, and the special film covering the cord may be peeled off after the sale or when beginning of use.

By such a structure, peeling of the film can be regarded as a starting point of oxidation. Therefore, it is possible to omit a step of obtaining the time or the like from the server. For example, in addition to the oxygen-impenneable film, a film having an impermeability of other gases may be used as a substitute, or these films may be used together.

In pigments, different raw materials are used for each color. For example, compounds contained in pigments of indigo and black (mainly, phthalocyanine blue and carbon black) are strongly bonded. Therefore, the compounds are difficult to be broken by ultraviolet rays contained in sunlight. On the other hand, compounds contained in pigments of yellow and crimson (mainly, disazo yellow and carmine 6B) weakly bonded. Therefore, if the compounds are exposed to ultraviolet rays with particularly strong power in light for a long time, the bond of the compounds is broken. As a result, yellow and crimson will discolor from the original color. Therefore, the pigment of yellow or crimson may be selected as the pigment P1 mentioned in the present embodiment, and specific characteristics may be selected in accordance with required characteristics. For example, suitable pigments are different depending on whether a period for detection is one week or one year.

In the present embodiment, an example of using a difference between optical densities has been described, but other indicators may be used. For example, a color-fading degree indicating a degree of color fading may be used. The method of using the color-fading degree is a method in which a test piece is exposed or heated with hot air, and a difference in whiteness or a color difference before and after the process is displayed. An ultraviolet carbon fade meter, a xenon fade meter, and so on are used for the test.

The color-fading degree can be obtained by processing at a predetermined temperature for a certain period of time and immediately measuring the whiteness or the color difference (L, a, b) (J.TAPPI NO. 21). In some cases, a fluorescence intensity Zf value may also be measured, and the color-fading degree may be indicated by a difference from the value before the process.

In the present embodiment, color fading (discoloration) has been evaluated using the decrease amount of the optical density. However, the color-fading degree of the color difference may be used as a determination reference. For example, the color difference ΔE can be calculated by the following formula (1).

[Formula 1]

$$\Delta E = [(\Delta L)^2 + (\Delta b)^2]^{1/2} = [(L_0 - L_1)^2 + (a_0 - a_1)^2 + (b_0 - b_1)^2]^{1/2}$$   formula (1)

Here, $L_0$, $L_1$, $a_0$, $a_1$, $b_0$, and $b_1$ indicate a color difference value respectively before and after processing. The greater the numerical value is, the greater the color fading-degree becomes. In this way, in order to examine the color-fading characteristics of itself, a method of testing under an accelerated condition that forcibly uses light, heat, and so on is used. Obviously, in order to create a database, it is better to use a result of natural deterioration after the year actually passed.

However, it takes a considerable date and time before the test result is obtained. Therefore, an acceleration test is performed in order to create the database for the pigments exemplified in the present embodiment. The acceleration deterioration test (J.TAPPI NO. 50) is performed as a test method of investigating strength deterioration so that many pigment characteristics can be investigated in a short time. Specifically, a deterioration of strength (folding strength) when it has been placed under 105±2° C. for 72 hours corresponds to about 25 years of natural deterioration at room temperature.

Organic pigments have characteristics that color fading is promoted by the influence of external environment such as light and heat, and it is difficult to maintain the function for a long time. For that reason, various light stabilizing agents have been used in order to suppress color fading and degradation of the organic pigments over time. Friction ink (registered trademark) is an improvement of research and development of ink called as Metamo color whose basic principle was discovered in 1975.

Metamo color is composed of a capsule in which a leuco dye and a color developer are encapsulated, and a material called as a discoloration temperature adjuster is further added to the capsule. By changing the type of the discoloration temperature adjuster, the characteristics of discoloration can be adjusted.

Metamo color is a pigment made by uniformly mixing the leuco dye, the color developer, and the discoloration temperature adjuster in a microcapsule and encapsulating them. The leuco dye is a component for determining colors such as black and red, but the leuco dye itself does not have color. However, it has characteristics of coloring in black, red, or the like when it is chemically combined with the color developer. This ink called as Metamo color may be used for forming the code.

Moreover, for example, an ink used in a ballpoint pen of gel ink (Signo) manufactured by Mitsubishi Pencil Co., Ltd. has excellent light resistance, and there is almost no color fading of drawn lines due to exposure. Therefore, by combining such an ink and pigments used for food additives, a difference in light resistance becomes remarkable. Therefore, such a combination may be used to detect the influence of light.

A dye (or mixture of dye and pigment) ink is inferior to a pigment ink in terms of light resistance of drawn lines. However, some products of dye ink have practically efficient light resistance characteristics. For example, there are some cases where there is almost no discoloration in drawn lines after twenty years have elapsed even if it is a dye ink.

Second Embodiment

In the present embodiment, a determination method utilizing a placement of pigments whose color tends to fade due to a specific gas will be briefly described.

Some pigments peculiarly discolor under a situation of high density of a specific gas. For example, information on freshness of foods may be obtained by using a pigment that shows a reaction specific to ethylene gas. Regarding a formulation of the code, similarly to the example of the first embodiment, a pigment showing a specific reaction to the ethylene gas may be used at a specific position.

Figure 13A:
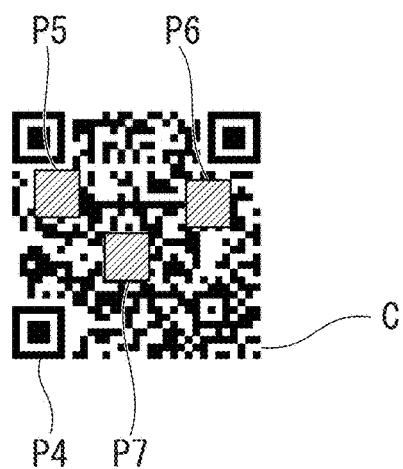
FIG. 13A is a drawing showing a form of the code C in the second embodiment.
Figure 13B:
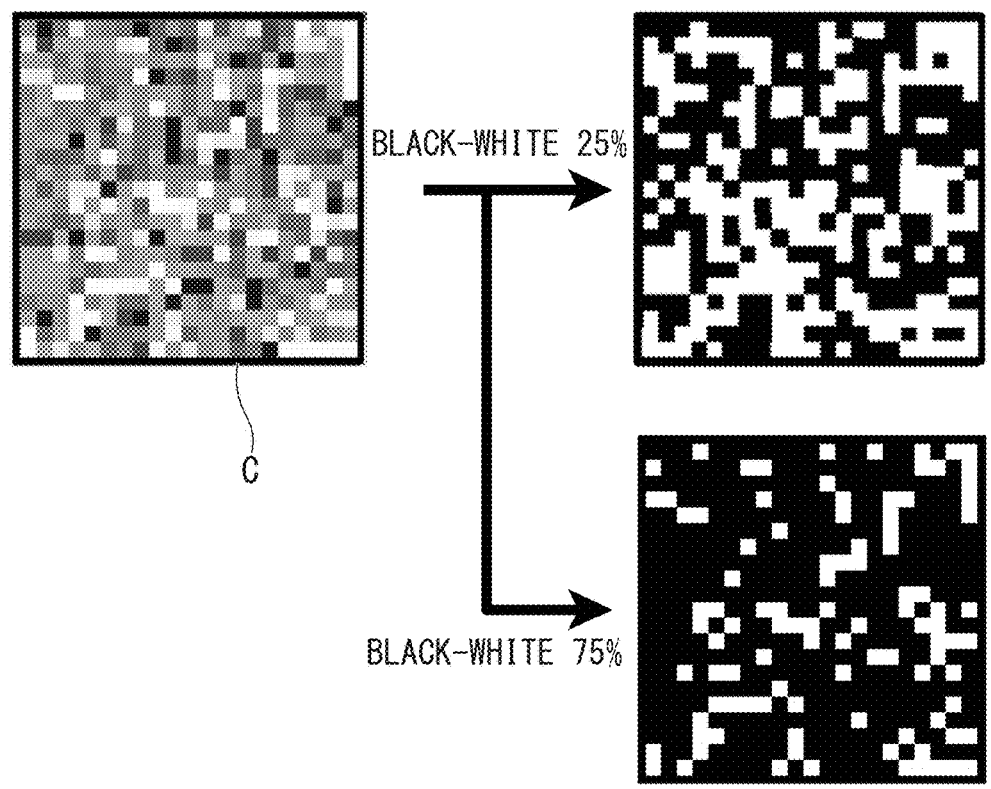
FIG. 13B is a drawing showing a form of the code C in the second embodiment.
Figure 14A:
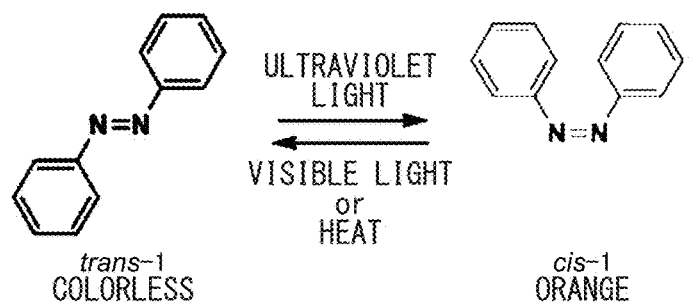
FIG. 14A is a drawing showing an example of a molecular structure of a pigment applicable to the embodiment.
Figure 14B:
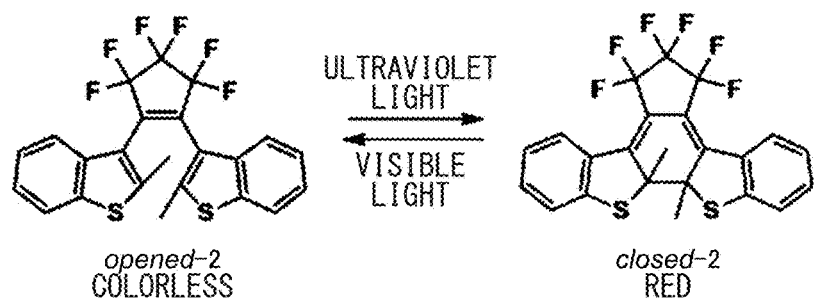
FIG. 14B is a drawing showing an example of a molecular structure of a pigment applicable to the embodiment.
Figure 14C:
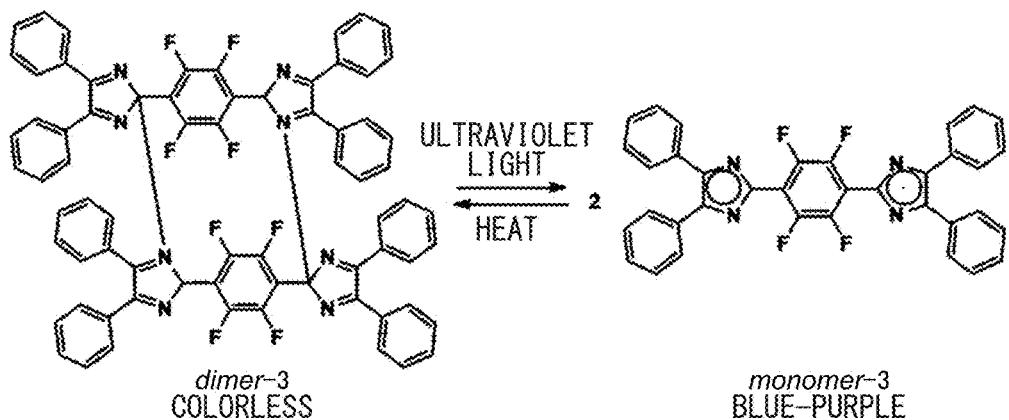
FIG. 14C is a drawing showing an example of a molecular structure of a pigment applicable to the embodiment.
Figure 14D:
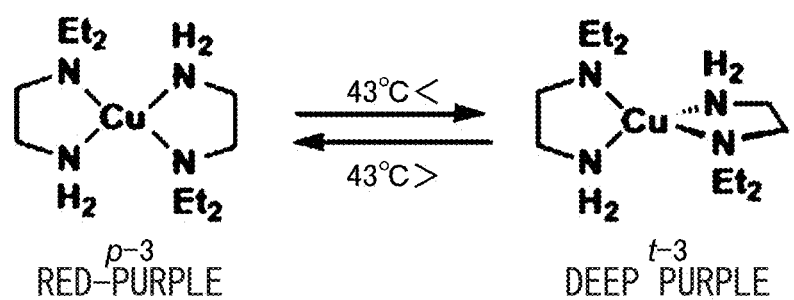
FIG. 14D is a drawing showing an example of a molecular structure of a pigment applicable to the embodiment.

For example, as shown in FIG. 13A, it is considered that the pigment showing a reaction specific to the ethylene gas (in this case, decrease in density) is included in the code C. In FIG. 13A, a pigment P4 which is capable of holding a stable hue and a stable density regardless of environmental situations, a pigment P5 whose color fades depending on a density of an environmental gas (for example, ethylene gas), a pigment P6 whose color is difficult to fade depending on the density of the environmental gas (for example, ethylene gas) but whose color is easy to fade at high temperature, and a pigment P7 whose color is difficult to fade without depending on the temperature environment and the environmental gas may be included in the cord C. Similarly to the example shown in FIG. 12A, the pigment P4 is used for a part holding the ID information.

By printing the code C having such a structure on a label added inside a package for food, it is possible to obtain a situation of the food. Obviously, it is possible to detect a decayed food and a ripe food by detecting a gas generated due to decay (fermentation) of food without being limited to ethylene.

Third Embodiment

In the present embodiment, an authenticity determining method using placement of pigments whose color is easy to fade will be briefly described.

Obviously, even if the code is observed at a certain time without referring to the database, it cannot be understood which part is printed with a pigment whose color is easy to fade. Specifically, it is assumed that the code C including a pigment whose color is easy to fade is scanned by a digital camera or the like, and the code C is printed by an inkjet printer. In this case, in the copied code, information representing a position where a pigment whose color is easy to fade is printed and information representing a position where a pigment whose color is difficult to fade are lost. Therefore, the information representing a position where a pigment whose color is easy to fade can be used as information for authenticity determination. In comparison to the conventional authenticity determination performed by using a hologram seal, Radio-frequency identification (RFID), or the like, it is possible to provide a means for authenticity determination at a relatively low cost.

In other words, a general user can check whether it is a genuine product or not by using a serial number, date and time, at any time. When trying to reproduce a product using this code C, it is necessary to specify the position of dots which are easy to discolor and which are embedded by a manufacturer of genuine products, and it is also necessary to obtain a pigment corresponding to the characteristics. This makes it difficult to reproduce the product to which the code C is attached. These processes may be performed using the information processing apparatus or the like described in the other embodiments.

Fourth Embodiment

In the present embodiment, a method of determining a usage situation by using a difference in scratch resistance will be briefly described.

By using the difference in scratch resistance of ink, it is possible to grasp a usage frequency and physical scratch characteristics in a conveyance route of the product. That is, if an ink having high scratch resistance and an ink having low scratch resistance are incorporated in the cord C, a density difference occurs due to the difference in scratch resistance. Mechanochromic pigments having self-recovering characteristics may be used for ink. Specifically, an organic fluorescent pigment in which a fluorescent pigment is doped in a wholly alicyclic polyimide is used. As a result, in addition to thermal responsiveness, it discolors when it is scratched, it turns back to the original color, and it emits light in accordance with a polarity of solvent.

For example, the code may be printed on each side of a cardboard of right side up with care, and a part having low scratch resistance other than the bottom surface may be checked. These processes may be performed using the information processing apparatus or the like described in the other embodiments.

Other Embodiments

In the present embodiment, it will be described focusing on other characteristics of pigments. As described in the other embodiments, it was considered that it is preferable to use a pigment which stably develops color regardless of environmental conditions in order to create stable printed products. However, by adding data processing, it is possible to effectively utilize the characteristics considered as weakness in the past.

Chromotopism is translated as "reversible discoloration" and is a generic name for phenomena in which colors change due to some external stimulus. Moreover, as it is "reversible", it is normal to return to the original color by another external stimulus.

For example, pigments have characteristics such as photochromism, thermochromism, electrochromism, solvatochromism, piezochromism, tribochromism, vapocromism, ionochromism, halochromism, acidichromism, and so on.

Examples of pigments having these characteristics are illustrated in FIG. 14A to FIG. 14D. In addition to the exemplified pigments, pigments having similar characteristics may be incorporated in the cord.

For example, the code may be created utilizing a difference in solubility in oil. In this case, a part printed with a pigment having lipid solubility is placed in a tag of clothes in order to determine sebum characteristics of the wearer's skin.

A pigment having the thermochromic characteristics will be described. A thermochromic molecule is colorless, but bond formation occurs when it is irradiated with ultraviolet light, and its color turns red. It is thought that the absorption band changes because the conjugation length changes. To the contrary, some pigments change to blue-purple because the bonds are disconnected due to irradiation with ultraviolet light. In a light resistance test, it is possible to shorten the test time by using extremely strong ultraviolet rays. In general, yellow and red are easy to fade, and indigo and black are difficult to fade.

While dyes are adsorbed on a paper in the form of molecules, pigments are absorbed on a paper in the form of particles in which molecules are gathered. This difference can be seen with a microscope, but since the pigment particles cannot be seen with human eyes, each of them looks red. However, there are differences in a vividness of color or the like. Since pigments are not soluble in water, there is an advantage that they do not dissolve even if water is poured to a red-painted paper.

Moreover, it may be recorded when the temperature reaches a predetermined temperature or higher by using the ink described in Japanese Unexamined Patent Application Publication No. 2006-193674. Thereby, even in the case of using a pigment whose amount of change in density or hue extremely fluctuates at the predetermined temperature or higher, it can be corrected.

There are not so many pigments which discolors due to light, and oxidation is mostly due to oxygen. Therefore, density of oxygen and intensity of ultraviolet ray may be added as one of elements of the environmental test. Obviously, if there are many variables to grasp the environmental progress, it is easy to correct. However, as the number of variables increases, the amount of calculation also increases. Therefore, it is possible to reduce the amount of calculation by limiting to the conditions under the normal use environment.

As described above, the code C includes a first part printed by using a first pigment, and a second part printed by using a second pigment which is easier to discolor than the first pigment. The computer 20 has the scanner 24 which reads the code C. The computer 10 has the CPU 11 (decoder) which decodes the code C read by the scanner 24 by using information about discoloration of the second pigment. A first result (ID information of the code C) is obtained if only the first part is decoded, and a second result (influence by the environment) is obtained if both the first part and the second part are decoded. Thereby, a new value for evaluating the influence of the environment can be provided.

Several embodiments of the present invention have been described above, but these embodiments are merely examples, and do not limit the technical scope of the present invention. The present invention can adopt various other embodiments, and various modifications such as omission and substitution can be made without departing from the scope of the present invention. These embodiments and modifications thereof are included in the scope of the invention described in this specification and the like, and are included in the invention described in the claims and the equivalent scope thereof.

Hereinafter, the invention described in the original claims of the present application will be noted.

[Supplementary Note 1]

A code comprising:

a first part printed by using a first pigment; and a second part printed by using a second pigment which is easier to discolor than the first pigment, wherein the code is decodable by using information about discoloration of the second pigment.

[Supplementary Note 2]

The code according to Supplementary Note 1, wherein identification information for identifying the information about discoloration of the second pigment is obtained by decoding the first part.

[Supplementary Note 3]

The code according to Supplementary Note 1,
wherein the code is decodable by using data in a database which stores a relationship between information on time and information on color.

[Supplementary Note 4]

The code according to any one of Supplementary Notes 1 to 3,
wherein the first pigment and the second pigment are different from each other in a fading speed at a predetermined temperature.

[Supplementary Note 5]

The code according to any one of Supplementary Notes 1 to 4,
wherein the first pigment and the second pigment are different from each other in scratch characteristics.

[Supplementary Note 6]

The code according to any one of Supplementary Notes 1 to 5,
wherein the first pigment and the second pigment are different from each other in ozone resistance.

[Supplementary Note 7]

An information processing method for decoding the code according to any one of Supplementary Notes 1 to 6.

[Supplementary Note 8]

An information processing method for encoding the code according to any one of Supplementary Notes 1 to 6.

[Supplementary Note 9]

An information processing apparatus for executing the information processing method according to Supplementary Notes 7 or 8.

[Supplementary Note 10]

A program configured for executing the information processing method according to Supplementary Notes 7 or 8 by a computer.

[Supplementary Note 11]

A storage medium which stores the program according to Supplementary Note 10.

[Supplementary Note 12]

An ink used for printing the code according to any one of Supplementary Notes 1 to 6.

[Supplementary Note 13]

A pigment contained in the ink according to Supplementary Note 12.

[Supplementary Note 14]

A storage device which stores the information about discoloration of the second pigment for decoding the code according to Supplementary Note 1.

[Supplementary Note 15]

An information processing apparatus which is connected to the storage device according to Supplementary Note 14, and configured to store the information about discoloration of the second pigment into the storage device.

[Supplementary Note 16]

A code comprising:

a first part printed by using a first pigment; and a second part printed by using a second pigment which is easier to discolor than the first pigment, wherein a first result is obtained if only the first part is decoded, and a second result is obtained if both the first part and the second part are decoded.

REFERENCE SIGNS LIST

N network
C code
10, 20 computer
11, 21 CPU
12, 22 memory
13, 23 bus
24 camera
10D storage

The invention claimed is:

1. A code comprising:
a first part printed using a first pigment; and
a second part printed using a second pigment which is easier to discolor than the first pigment, wherein
the optical density of said second pigment changes when the second pigment discolors, and
the second part of the code is decodable by calculating a difference between (i) the optical density of the second part and (ii) an earlier optical density of the second part, the earlier optical density of the second part being the optical density of the second part at a time of printing the second part or the optical density of the second part at a time it was previously determined.

2. The code according to claim 1, wherein decoding the second part of the code further comprises comparing the difference between the optical density of the second part and the earlier optical density of the second part to predetermined information concerning the discoloration characteristics of the second pigment.

3. The code according to claim 1, wherein an influence of light on decoding the second part of the code is extracted by using a determined change in optical density of the first part to correct the determined difference between the optical density of the second part and the earlier optical density of the second part.

4. The code according to claim 1, wherein the first pigment and the second pigment exhibit different fading speeds at a predetermined temperature.

5. The code according to claim 1, wherein the first pigment and the second pigment exhibit different scratch resistance.

6. The code according to claim 1, wherein the first pigment and the second pigment exhibit different ozone resistance.

7. The code according to claim 1, wherein decoding said first part provides information identifying said second pigment.

8. An information processing method for decoding a code, the code comprising a first part printed using a first pigment and a second part printed using a second pigment which is easier to discolor than the first pigment, wherein the optical density of said second pigment changes when the second pigment discolors, the method comprising the steps of:
calculating a difference between (i) the optical density of the second part and (ii) an earlier optical density of the second part, the earlier optical density of the second part being the optical density of the second part at a time of printing the second part or the optical density of the second part at a time it was previously determined; and
comparing the difference between the optical density of the second part and the earlier optical density of the second part to predetermined information concerning the discoloration characteristics of the second pigment.

9. The information processing method according to claim 8, further comprising determining a change in optical density of the first part; and using said change in optical density of the first part to correct the determined difference between the optical density of the second part and the earlier optical density of the second part, thereby extracting an influence of light on decoding said second part of the code.

10. An information processing method for encoding a code, the code comprising a first part printed using a first pigment and a second part printed using a second pigment which is easier to discolor than the first pigment, wherein the optical density of said second pigment changes when the second pigment discolors, the method comprising the steps of:

printing said first part using said first pigment and printing said second part using said second pigment;

determining the optical density of the second part; and recording said optical density of the second part.

11. An information processing apparatus for executing an information processing method for decoding a code, the code comprising a first part printed using a first pigment and a second part printed using a second pigment which is easier to discolor than the first pigment, wherein the optical density of said second pigment changes when the second pigment discolors, the method comprising the steps of:

calculating a difference between (i) the optical density of the second part and (ii) an earlier optical density of the second part, the earlier optical density of the second part being the optical density of the second part at a time of printing the second part or the optical density of the second part at a time it was previously determined; and comparing the difference between the optical density of the second part and the earlier optical density of the second part to predetermined information concerning the discoloration characteristics of the second pigment.

12. The information processing apparatus according to claim 11, which is connected to a storage device configured to store the predetermined information concerning the discoloration characteristics of the second pigment and said earlier optical density of the second part.

13. A non-transitory computer readable storage medium which stores a program configured for executing the information processing method according to claim 8 by a computer.

* * * * *